Sept. 23, 1969   P. H. SANFORD   3,468,165
OVERRANGE LINK

Filed Nov. 9, 1967   4 Sheets-Sheet 1

INVENTOR.
PHILIP H. SANFORD
BY
Lawrence H. Poston
AGENT

Sept. 23, 1969  P. H. SANFORD  3,468,165
OVERRANGE LINK
Filed Nov. 9, 1967  4 Sheets-Sheet 2

INVENTOR.
PHILIP H. SANFORD
BY
*Lawrence H. Poeton*
AGENT

Sept. 23, 1969      P. H. SANFORD      3,468,165

OVERRANGE LINK

Filed Nov. 9, 1967      4 Sheets-Sheet 3

INVENTOR.
PHILIP H. SANFORD

BY Lawrence H. Poston

AGENT

Sept. 23, 1969     P. H. SANFORD     3,468,165
OVERRANGE LINK

Filed Nov. 9, 1967     4 Sheets-Sheet 4

INVENTOR.
PHILIP H. SANFORD

BY
Lawrence H. Poston

AGENT

United States Patent Office 3,468,165
Patented Sept. 23, 1969

3,468,165
OVERRANGE LINK
Philip H. Sanford, Walpole, Mass., assignor to The Foxboro Company, Foxboro, Mass., a corporation of Massachusetts
Filed Nov. 9, 1967, Ser. No. 681,713
Int. Cl. G01l 7/02
U.S. Cl. 73—398   7 Claims

ABSTRACT OF THE DISCLOSURE

An elongate mechanical link for use in measurement or control instruments or systems, normally operated under end tension but set to flexibly buckle under overrange end compression, the link comprising a set of flexible strips and a strip separating member transversely of the link, with the strips over and under the separating member in weaving fashion.

---

This invention relates to mechanical linkage and has particularly reference to overrange situations with repect thereto.

A particular application of this invention is linkage used in measurement or control instruments and systems wherein delicate instrument parts are easily and substantially damaged by forces beyond the normal operating range. This is particularly true of electronic instruments wherein the damageable parts may be expensive in themselves as well as possibly introducing expensive errors into substantial processes, when damaged.

In the structure and use of measurement and control instrumentation, various elements are found to be necessary. Among these are mechanical links for transferring force and/or motion, overrange devices to protect delicate parts or adjustments, and flexures to provide precise pivot function without hinge structures. To achieve compact, accurate structures, it is advantageous to combine these functions rather than to proceed with individual, separate units as in the past.

Links with overrange additions are common place, and links which also act as flexures have been used.

This invention provides a unique combination of link and overrange function in the same device, and can also be provided with flexure function to provide all three functions in a simple unitary structure.

This invention provides a break-away or buckling link to provide overrange protection. To this, flexure points may be added at one or both ends of the buckling structure.

In the illustrative application of this invention as presented herein, a single elongate link is provided with small operative rigidity under lengthwise compression. The link buckles outwardly under endwise overrange forces. The normal operating situation is tensile.

The link unit is in the form of a thin flexible rectangular piece, with lengthwise slots defining lengthwise strips, transversely between which a separation member is weaved. By putting the strips under small spring bias against the separation member, the link is made operatively rigid under small end compression forces. When the link is buckled, there is effectively a full release, with minimum opposition within the dimensional limits of the link. The amount the separation member wedges the strips apart is a determining factor of the load under which the unit will resist initial deflection under compression.

Other objects and advantages of this invention will be in part apparent and in part pointed out hereinafter and in the accompanying drawings, in which.

Figure 1:
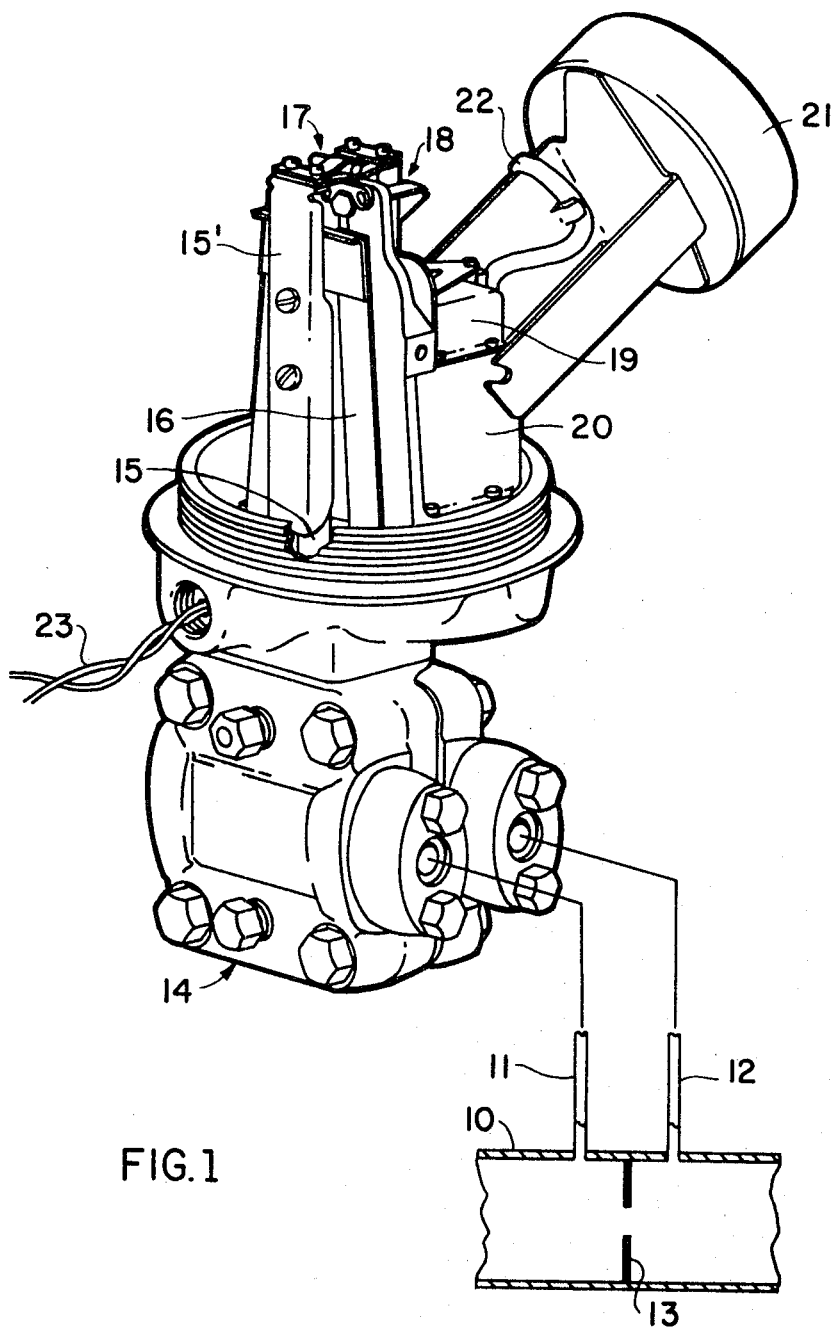
FIGURE 1 is an assembly view of an electronic differential pressure transmitter of which the overrange link according to this invention is a part, as in illustrative application of this invention.

The electronic differential pressure transmitter of FIGURE 1 (note the FIGURE 2 schematic) senses flow in pipe 10 from pressure taps 11 and 12 of either side of an orifice plate 13. The lower housing 14 of the transmitter contains a diaphragm capsule to which the opposing pressures of the taps 11 and 12 are applied. The force resulting from the differential pressure is applied to a vertical force bar 15. An upright framework of flexures 16 is secured at the top to a vertical connector plate 15′ mounted on the force bar 15. A top cross-connector unit 17 is an overrange link according to this invention, and in this case it is a flexure as well. The back end of the connector 17 is connected to a vertical back lever structure 18 which is responsive to normally tensile forces applied to the connector 17 from the force bar 15, and in turn actuates the electronic system comprising a detector 19 and a force motor 20. An electronic amplifier unit 21 is normally above the connecter 17 but is shown here swung out of position. A cable 22 leads to and from the amplifier 21, and the output of the device is through wires 23.

Figure 2:
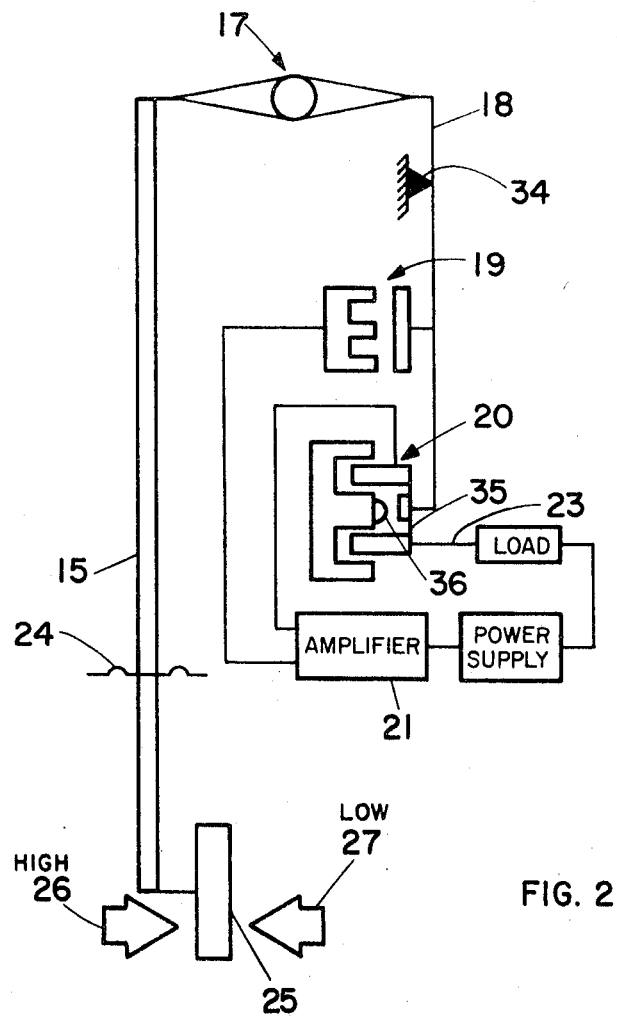
FIGURE 2 is a schematic of the system of the assembly of FIGURE 1, illustrating the function therein of the overrange link according to this invention.

FIGURE 2 schematically shows the system of FIGURE 1 with like reference numbers on like elements. The detector and force motor units are suitable combinations of magnets and coils in which an upset condition in the detector occasioned by movement tendency of the lever system 18, is counteracted and balanced by action in the force motor 20, to provide the overall system with a force-balance function. The force bar 15 is mounted on a horizontal flexure seal 24, and the diaphragm 25 is located within the lower housing 14, with arrows 26 and 27 representing the high and low pressures respectively from the FIGURE 1 pressure taps 11 and 12.

Figure 3:
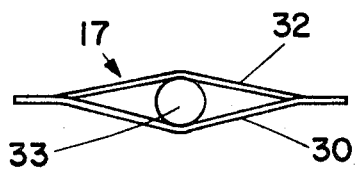
FIGURE 3 is an illustration of a link according to this invention, in normal operating range conditions.
Figure 4:
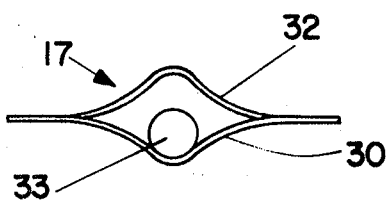
FIGURE 4 shows the link of FIGURE 3 is buckled, overrange conditions.
Figure 5:
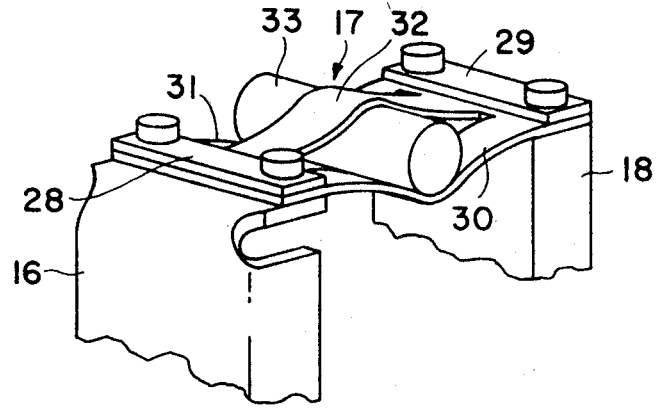
FIGURE 5 is an enlargement of the link portion of FIGURE 1.

FIGURES 3, 4 and 5 illustrate the connector unit 17 of FIGURE 1 in more detail. As in FIGURE 5, it comprises an elongate, rectangular piece of thin and flexible metal, secured at its ends to the tops of the support structures 15′ and 18 of FIGURE 1 by bolted keeper plates 28 and 29. The elongate piece is twice slotted lengthwise by parallel coextensive slots to provide three lengthwise strips, two outside at 30 and 31, and one middle strip at 32. Transversely of the strips, over the outside strips and under the central strip, a separation member 33 is mounted, spot welded to the outside strips 30 and 31. The middle strip 32 engages the separation member by means of its own resiliency in a spring bias contact. This spring bias may be otherwise provided as desired and is usually a small force. The separation member may be a tube.

Thus in FIGURE 5, the flexible strips 30, 31 and 32 are over and under the separation member 33, in weaving fashion. This device therefore embodies a set of arched strips, joined at their ends and part of a single piece. The spring bias of the strips toward each other and against the separator 33 may be small, and provides the link with lengthwise rigidity under small compressive forces with the strip 32 remaining in engagement with the separator 33. This is a base position to which the strip 32 returns after overrange to maintain the precise desired operating length of the link, maintaining integrity of calibration in the system.

FIGURES 3 and 4 illustrate the normal situation and the overrange situation, respectively, of the link device, when overrange by lengthwise end overrange compression forces. Such overrange may occur by accidental reversal of the high and low pressures on the diaphragm capsule 25.

Figures 6, 7:
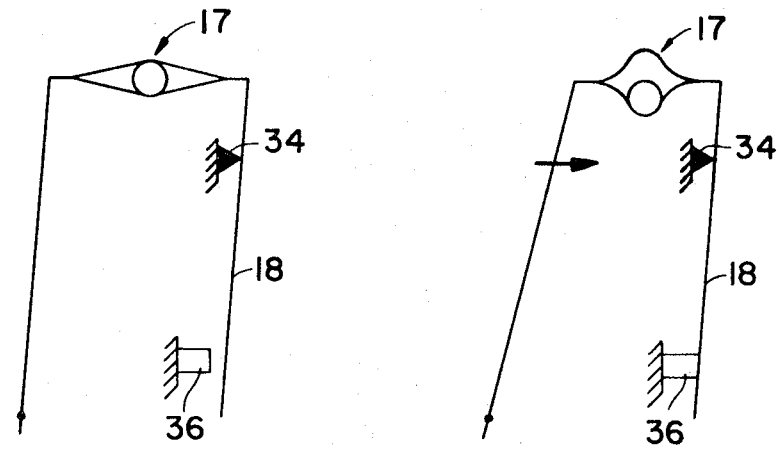
FIGURE 6 illustrates a portion of the system of FIGURE 2 in operating position just short of overrange.
FIGURE 7 shows the system of FIGURES 2 and 6 in an overrange situation.

This overrange action is illustrated in FIGURES 6 and 7, with respect to the system of FIGURE 2. FIGURE 2 shows unit 17 in a norm position. FIGURE 6 illustrates a situation where an overrange signal has moved the link 17 to the right to the extent that the member 18, in moving about a pivot 34, has moved (see FIGURE 2) the force motor movable unit 35 up to a stop 36. Thus the overrange force cannot further pivot the member 18, and this overrange force thus applies end compression to the link 17, with the buckling result indicated in FIGURE 7. When the force is removed, the link returns to the condition of FIGURES 2 and 3.

Figure 8:
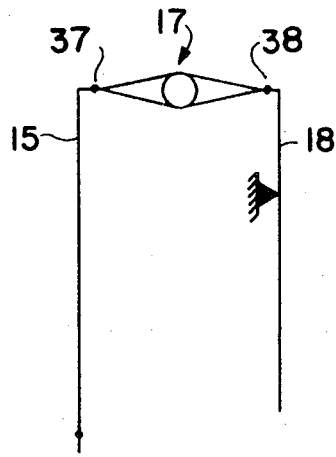
FIGURE 8 is a schematic showing of part of the system of FIGURE 2 indicating flexure points in the link unit.
Figure 9:
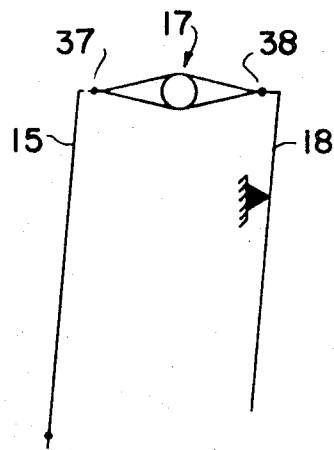
FIGURE 9 is a further showing of FIGURE 8, illustrating flexure action as the link system is moved to one side.
Figure 10:
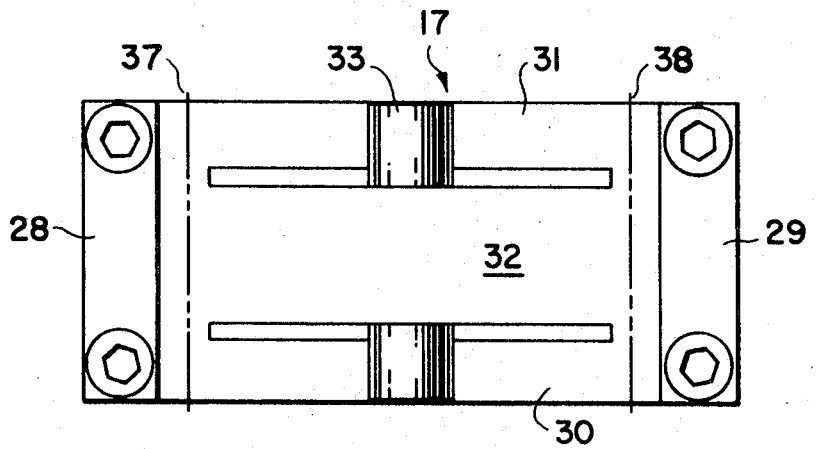
FIGURE 10 is a plan view of a link according to this invention, further showing the location of the flexure lines transversely of the link.

FIGURES 8 and 9 are similar showings of the system, showing the flexure action possible with this device in a system such as that of FIGURES 1 and 2. The flexure points 37 and 38 of FIGURES 8 and 9 are in fact transverse flexure lines as shown in FIGURE 10. These flexure lines are between the flexure strips and the ends of the flexure, and are determined at least in part by the location of ends of the slots which define the strips.

This invention thus provides a combination link and overrange device, which may also be a triple combination of link, overrange, and flexure in a single unit.

As many embodiments may be made of the above invention, and as changes may be made in the embodiment set forth above without departing from the scope of the invention, it is to be understood that all matter set forth hereinbefore and in the accompanying drawings is to be interpreted as illustrative only and not in a limiting sense.

I claim:

1. A mechanical connector device in the form of an elongate link unit for use in measurement or control instruments or systems, wherein said link normally operates under end tension and wherein said link flexibly buckles under overrange lengthwise end compression, said link comprising a set of flexible strips, and a strip separating member mounted transversely of said link, with said strips over and under said separating member in weaving fashion.

2. A connector according to claim 1 with said strips spring biased against said separating member as a determining factor of the load under which unit will resist initial buckling.

3. A connector according to claim 1 including flexure areas between said strips and the ends of said device.

4. A connector according to claim 1 wherein said elongate link is a thin rectangular body having lengthwise slots defining said flexible strips.

5. A link according to claim 1 having three of said strip portions side-by-side and wherein said separation member is a rigid metal member extending transversely over the two outside strips and under the center strip, with said separation member secured to said outside strips, and said center strip spring biased against said separation member to provide a solid base defining the correct operating length of said link.

6. A mechanical link device in the form of a flexible, elongate member for use in measurement or control instruments or systems, wherein the link, is normally operated under end tension and is collapsible under end compression overrange force, with a transverse axis flexure pivot line adjacent each end of the link, said link comprising said elongate member with lengthwise slots therein defining strip portions, and a strip separating member mounted and secured transversely of said link, with said strips over and under said separating member in weaving fashion, wherein said strips are spring biased against said separating member, and wherein the location of said transverse pivot lines is determined at least in part by the location of the ends of said lengthwise slots.

7. An electronic differential pressure transmitter system with unidirectional overrange means, comprising, in combination, a differential pressure responsive diaphragm unit, a force bar secured to and responsive to said diaphragm unit, a mechanical overrange device according to claim 1, having one end secured to said force bar, a lever secured to the other end of said overrange device; and magnetic sensing and balancing means secured to said lever to produce electrical output representative of said differential pressure, in response to action of said lever through the influence of said diphragm unit as transmitted through said force bar and said overrange device.

References Cited

UNITED STATES PATENTS

| | | | |
|---|---|---|---|
| 2,634,122 | 4/1953 | Wolfard | 267—7 |
| 3,290,945 | 12/1966 | Li, et al. | 73—407 |
| 3,389,902 | 6/1968 | Young | 267—1 |

DONALD O. WOODIEL, Primary Examiner

U.S. Cl. X. R.

267—1